United States Patent [19]

Herwig et al.

[11] 3,875,129

[45] Apr. 1, 1975

[54] MIXTURES OF THERMOPLASTIC POLYAMIDES

[75] Inventors: Walter Herwig, Neuenhain, Taunus; Harald Cherdron, Naurod; Ludwig Brinkmann, Frankfurt, Main, all of Germany

[73] Assignee: Hoechst Aktiengesellschaft, Frankfurt, Main, Germany

[22] Filed: Nov. 14, 1973

[21] Appl. No.: 415,636

[30] Foreign Application Priority Data
Nov. 16, 1972 Germany.............................. 2256217

[52] U.S. Cl....... 260/857 TW, 260/37 N, 260/78 R, 260/78 A
[51] Int. Cl............................................. C08g 41/04
[58] Field of Search............................. 260/857 TW

[56] References Cited
FOREIGN PATENTS OR APPLICATIONS

| | | | |
|---|---|---|---|
| 918,637 | 2/1962 | United Kingdom | 260/857 TW |
| 2,060,701 | 6/1972 | Germany | |
| 2,060,702 | 6/1972 | Germany | |
| 2,060,704 | 6/1972 | Germany | |

*Primary Examiner*—Paul Lieberman
*Attorney, Agent, or Firm*—Curtis, Morris & Safford, P.C.

[57] ABSTRACT

There are disclosed and claimed novel mixtures of thermoplastic polyamides, namely mixtures of at least one polyamide derived from 1,3-bis-aminomethyl-cyclohexane, which optionally is partly replaced by 1,4-bis-aminomethyl-cyclohexane and optionally at least one aliphatic diamine, at least one aromatic dicarboxylic acid and optionally at least one aliphatic dicarboxylic acid, and optionally at least one aminocarboxylic acid, with at least one polyamide each of the polyamide 6 and/or polyamide 6,6 types. The mixtures of the invention combine good mechanical with good flow properties.

21 Claims, 1 Drawing Figure

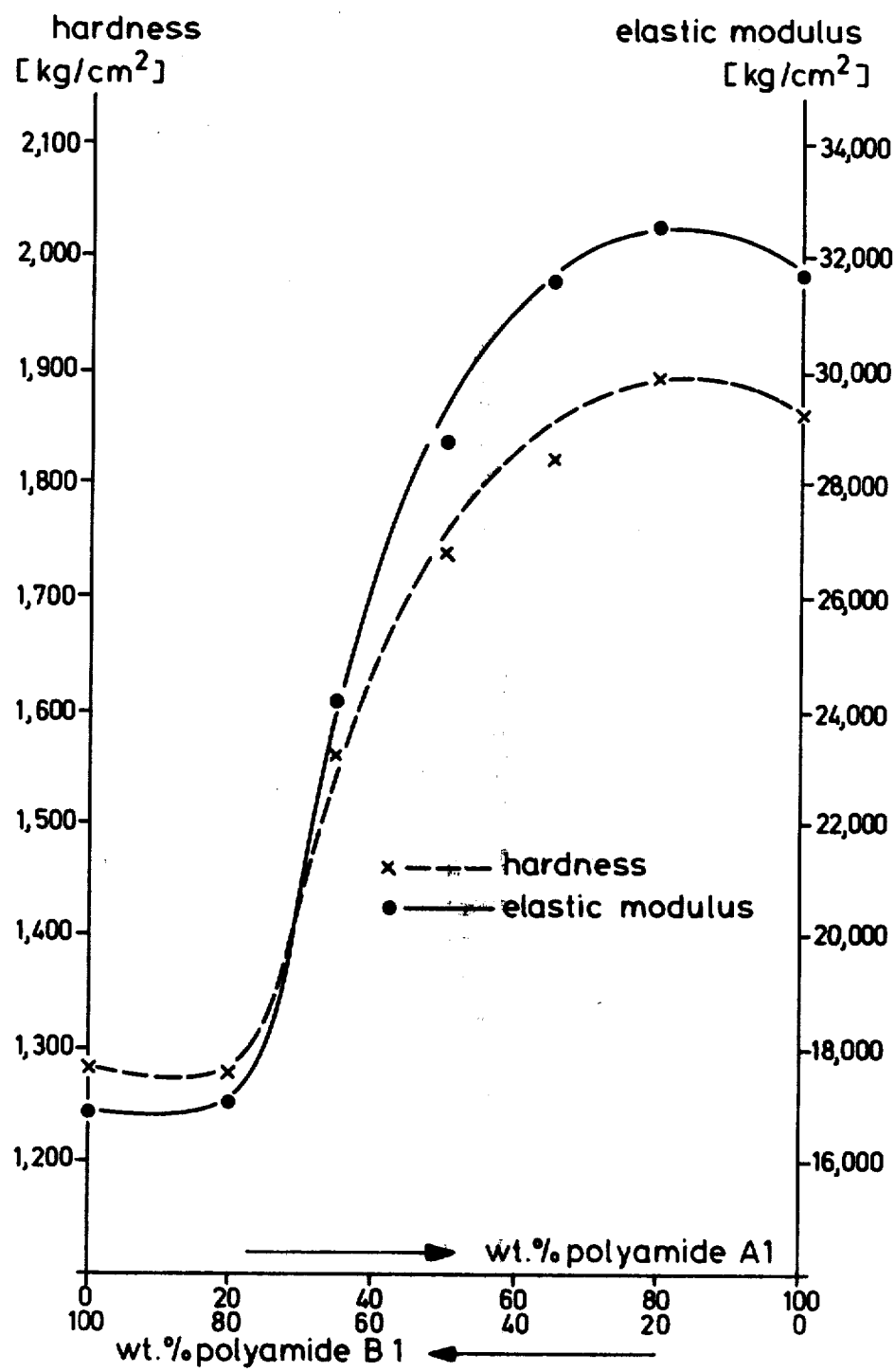

MIXTURES OF THERMOPLASTIC POLYAMIDES

The present invention relates to mixtures of thermoplastic polyamides.

Recently polyamides have been repeatedly described which are transparent because of their amorphous character and, because of relatively high glass transition points, are distinguished by high dimensional stability under heat. Such thermoplasts are therefore recommended especially for use in the technical field. These moulding compositions have, however, important disadvantages. Good mechanical properties are obtained only with very high-molecular products of high melt viscosity the processing of which presents considerable difficulties in precision injection moulding under certain circumstances. Clear transparency without yellow tinges often requires addition of optical brighteners. The high costs of the monomers and expensive condensation technology limit the extent of use of the products.

Various authors have attempted to influence certain properties of transparent polyamides by compounding (intimate mixing) (German Offenlegungsschrift 1.805.921, which corresponds to British Patent Specification No. 1,231,999, Canadian Patent Specification No. 891,550 and U.S. Pat. No. 3,646,156; German Offenlegungsschrift 1.769.040, which corresponds to British Patent Specifications Nos. 1,267,376 and 1,268,739, Canadian Patent Specification No. 898,549 and U.S. Pat. No. 3,642,941).

It has now been found that mixtures of thermoplastic polyamides consisting of a. at least one polyamide, which consists exclusively of units of the general formulae

Ia in quantities of m mol % and

Ib in quantities of $n$ mol % and the end groups $R_4$ and $R_5$ wherein $R_1$ represents a cyclohexane-1,3-bis-methylenyl radical, randomly distributed over the macromolecule, of from 0 to 50 mol %, preferably from 0 to 35 mol %, of this radical being replaced by a cyclohexane-1,4-bis-methylenyl radical, and optionally at least one, straight-chain, bivalent aliphatic hydrocarbon radical, likewise randomly distributed over the macromolecule, and containing from 4 to 20 carbon atoms, preferably from 6 to 12 carbon atoms, the proportion of the aliphatic hydrocarbon radical(s), in the case of $n = 0$ mol %, being within the range of from 5 to 70 mol %, preferably from 10 to 40 mol %, and, in the case of n being greater than 0 mol %, being reduced by the proportion which corresponds to n, and which proportion can fall to 0 mol %, the proportion (in mol %) of the aliphatic hydrocarbon radical(s) being calculated on the sum of the cyclohexane-bis-methylenyl radical(s) and aliphatic hydrocarbon radical(s);

$R_2$ represents at least one bivalent aromatic hydrocarbon radical, randomly distributed over the macromolecule, and containing from 5 to 18 carbon atoms, preferably from 6 to 12 carbon atoms, in particular, a mono-nuclear hydrocarbon radical bound in meta- or para position, and optionally at least one bivalent aliphatic saturated hydrocarbon radical, likewise randomly distributed over the macromolecule, and containing from 3 to 18 carbon atoms, preferably from 4 to 10 carbon atoms, the proportion of the aliphatic radical(s), in the case of $n = 0$ mol %, being within the range of from 5 to 70 mol %, preferably from 10 to 40 mol %, and, in the case of n being greater than 0 mol % being reduced by the proportion which corresponds to n, and which proportion can fall to 0 mol %, the proportion (in mol%) of the aliphatic hydrocarbon radical(s) being calculated on the sum of the aromatic and aliphatic radicals;

$R_3$ represents at least one straight-chain, bivalent aliphatic hydrocarbon radical, randomly distributed over the macromolecule, and containing from 3 to 19 carbon atoms, preferably from 4 to 11 carbon atoms;

$R_4$ represents H, or $OC-R_2\text{-}COOH$, or $OC-R_{3-NH_2}$; $R_5$ represents OH or $NH-R_1-NH_2$, or $NH-R_3-COOH$; whereby m and n indicate the proportions in mol %, in which the units I a and I b are statistically distributed in the macromolecule, where n is 0 or a finite value, so that the proportion thereof alone, or together with the proportions of the straight chain, bivalent, aliphatic hydrocarbon radicals $R_1$ and $R_2$ is from 5 to 70 mol %, preferably from 10 to 40 mol %, calculated on the total weight of the polyamide, and $m + n$ is 100;

said polyamide (a) having a mean degree of polymerisation corresponding to a reduced specific viscosity of a solution of 1 g of the polyamide in 100 ml of phenol/tetrachloroethane (in a weight ratio of 60 : 40) at 25°C of from 0.8 dl/g to 2.0 dl/g, preferably from 1.0 to 1.7 dl/g, and b. at least one polyamide of the general formula II

II wherein $R_3$ has the above meaning, in formula II said radical $R_3$ possibly being different from the radical $R_3$ in the formula I b, and y indicates the mean degree of polymerisation, which, corresponds to a reduced specific viscosity within the range of from 1.2 to 3.0 dl/g, preferably from 1.8 to 2.5 dl/g, determined in a solution of 1 g of the polyamide in 100 ml of phenol/tetrachloroethane (in the weight ratio of 60 : 40) at 25°C;

and/or c. at least one polyamide of the general formula III

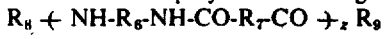

III wherein $R_6$ represents at least one straight chain aliphatic hydrocarbon radical randomly distributed over the macromolecule and containing from 4 to 20 carbon atoms, preferably from 6 to 12 carbon atoms, $R_7$ represents at least one aliphatic saturated hydrocarbon radical randomly distributed over the macromolecule and containing from 3 to 18 carbon atoms, preferably from 4 to 10 carbon atoms, $R_8$ represents H or $OC-R_7-COOH$, and $R_9$ represents OH or $NH-R_6-NH_2$, and z indicates the mean degree of polymerization, which corresponds to a reduced specific viscosity whithin the range of from 1.2 to 3.0 dl/g, preferably from 1.8 to 2.5 dl/g, determined in a solution of 1 g of the polyamide in 100 ml of phenol/tetrachloroethane (in the weight ratio of 60:40) at 25°C.

the proportion of b) and/or c) in the mixture being from 1 to 70 % by weight, preferably from 3 to 60 % by weight, combine unexpectedly good mechanical properties, such as rigidity and hardness, with good flow properties.

Mixtures of thermoplastic polyamides according to the invention have especially good properties, when they contain at least one polyamide according to (a) wherein m is from 95 to 50 mol %, preferably from 90 to 70 mol %, and n is from 5 to 50 mol %, preferably from 10 to 30 mol % and $R_1$ represents a cyclohexane-1,3-bis-methylenyl radical, with from 0 to 50, preferably from 0 to 35 mol %, of this radical being replaced by a cyclo-hexane-1,4-bis-methylenyl radical, $R_2$ represents a para-phenylene radical which is replaced completely or partly by a meta-phenylene radical, and $R_3$ represents a $-(CH_2)_5-$radical, or wherein m is 100 mol % and n is mol %, and $R_1$ represents a cyclo-hexane-1,3-bis-methylenyl radical, randomly distributed over the macromolecule, with from 0 to 50 mol %, preferably from 0 to 35 mol % of this radical being replaced by a cyclo-hexane-1,4-bis-methylenyl radical, and at least one straight chain, aliphatic bivalent hydrocarbon radical, likewise randomly distributed over the macromolecule, and containing from 4 to 20 carbon atoms, preferably from 6 to 12 carbon atoms, the proportion of the aliphatic hydrocarbon radical(s), calculated on the sum of the cyclohexane-bis-methylenyl radical(s) and aliphatic hydrocarbon radical(s), being from 5 to 50 mol %, preferably from 10 to 30 mol %, $R_2$ represents a para-phenylene radical, randomly distributed over the macromelocule, this radical being replaced completely or partly by a meta-phenylene radical, and at least one aliphatic saturated bivalent hydrocarbon radical, containing from 3 to 18 carbon atoms, preferably from 4 to 10 carbon atoms, the proportion of the aliphatic hydrocarbon radical(s), calculated on the sum of the para-phenylene and/or metaphenylene radical(s) and aliphatic hydrocarbon radical(s), being from 5 to 50 mol %, preferably 10 to 30 mol %, and the aliphatic hydrocarbon radicals $R_1$ and $R_2$ being present in equimolar quantities.

The polyamides (a) and (b) and/or (c) to be used according to the invention are obtained by polycondensation of diamines, dicarboxylic acids and aminocarboxylic acids or amide-forming derivatives of these compounds such as dicarboxylic acid halides, esters, nitriles or amides, or lactams, in known way and under the usual conditions.

The starting materials are as follows:

For the preparation of the polyamides a)

1. 1,3-bis(amino-methyl)-cyclo-hexane or mixtures of from 50 to 100 mol %, preferably from 65 to 100 mol %, 1,3-bis(amino-methyl)-cyclo-hexane and from 50 to 0 mol %, preferably from 35 to 0 mol %, 1,4-bis(amino-methyl)-cyclo-hexane, 2. optionally at least one straight chain, aliphatic diamine having from 4 to 20 carbon atoms, preferably from 6 to 12 carbon atoms, 3. at least one aromatic acid containing from 7 to 20 carbon atoms, preferably from 8 to 14 carbon atoms, especially mononuclear dicarboxylic acid carrying carboxy groups in meta- or para-position, or the amide-forming derivative thereof (halide, ester, nitrile, amide)

4. optionally at least one aliphatic saturated dicarboxylic acid, containing from 5 to 20 carbon atoms, preferably from 6 to 12 carbon atoms, or the amide-forming derivative thereof (halide, ester, nitrile, amide) and 5. optionally at least one straight chain aliphatic aminocarboxylic acid, containing from 4 to 20 carbon atoms, preferably from 5 to 12 carbon atoms, especially ω-aminocarboxylic acid or the lactam thereof.

The starting materials are used in such quantities that in the finished polyamide the individual components are contained in the above molar proportions. The diamines (1) and (2) correspond to the radicals $R_1$ in the general formula Ia, the dicarboxylic acids (3) and (4) to the radicals $R_2$ in the general formula Ia, the aminocarboxylic acids (5) or (6) (cf. below) correspond to the radicals $R_3$ in the general formulae Ib or II, the diamine(s) 7) (cf. below) correspond(s) to the radical(s) $R_6$ in the general formula III, and the dicarboxylic acid(s) (8) (cf. below) to the radical(s) $R_7$ in the general formula III.

For the preparation of the polyamides b)

6. at least one straight chain aliphatic aminocarboxylic acid, containing from 4 to 20 carbon atoms, preferably from 5 to 12 carbon atoms, especially ω-aminocarboxylic acid, or the lactam thereof, For the preparation of the polyamides c)

7. at least one straight-chain aliphatic diamine containing from 4 to 20 carbon atoms, preferably from 6 to 12 carbon atoms, and 8. at least one aliphatic saturated, dicarboxylic acid containing from 5 to 20 carbon atoms, preferably from 6 to 12 carbon atoms, or the amide-forming derivative thereof.

The diamines of paragraph (1) above can be obtained by hydrogenation of the corresponding xylylenediamines. Especially suitable for the preparation of the component a) of the mixtures of the invention are trans-1,3-bis-(amino-methyl)-cyclo-hexane and mixtures of trans-1,3-bis-(amino-methyl)-cyclo-hexane and trans-1,4-bis-(amino-methyl)-cyclo-hexane. However, the corresponding cis-diamines or mixtures of cis- and trans-diamines can also be used.

Examples of diamines of paragraph (2) (7) above are: tetramethylene diamine, pentamethylene diamine, octamethylene diamine or dodecamethylene diamine. Hexamethylene diamine is used preferably.

As the aromatic acid of paragraph (3) above isophthalic acid, terephthalic acid and mixtures of these acids are suitable. Further advantageous examples are: 2,5-pyridine-dicarboxylic acid, 4,4'diphenyldicarboxylic acid, 1,4-, 1,5- and 2,6-naphthalene dicarboxylic acids, as well as 4,4'-diphenylsulfonedicarboxylic acid.

Examples of suitable dicarboxylic acids according to paragraphs (4) and (8) above are: 2-methyl-glutaric acid, pimelic acid, suberic acid, azelaic acid, sebacic acid, or 1,10-decane-dicarboxylic acid. Adipic acis is especially suitable.

As the amino-carboxylic acid of paragraphs (5) and (6) above, amino-pivalic acid, ⍵-amino-caproic acid and ⍵-amino-dodecanoic acid are suitable.

The polyamides are prepared according to polycondensation processes known for a long time.

For the preparation of the moulding compositions of the invention 30 to 99 % by weight, preferably from 40 to 97 % by weight, of a polyamide or respectively of a mixture of several polyamides a) are mixed in a suitable way with 1 to 70 % by weight, preferably from 3 to 60 % by weight, of a polyamide or respectively of a mixture of several polyamides b) and/or c), for example, in the form of granules and directly processed to shaped articles on an injection moulding machine.

Under certain technological conditions, for example, using a poorly homogenizing plunger injection moulding machine, it may, however, also be advisable to melt together the polyamides according to (a) and (b) and/or (c) beforehand, for example, in a condensation vessel or in an extruder, to chill the drawn off profile in a water bath, to granulate it and to feed the homogenous granules after drying to the processing machine.

The good mechanical properties of the compounds of the invention are surprising. These are clearly seen from the accompanying FIG. 1 illustrating the numerical dependence of the modulus in flexure and the hardness on the mixing proportion of polyamide $A_1$ (from terephthalic acid, 1,3- and 1,4-bis-(amino-methyl)-cyclohexanes and $\epsilon$-caprolactam) and $B_1$ (poly-2-capronamide: polyamide 6) according to Examples 1 to 7.

From the FIGURE it can be seen that hardness and modulus in flexure of the polyamide $A_1$ only change slightly with additions of 20 to 35 % by weight of polyamide 6 and a compound with 50 % by weight of polyamide 6 has still a modulus of elasticity of 28,700 kg/cm² and a ball indentation hardness of 1740 kg/cm². It is further remarkable that these blends remain transparent up to additions of from 50 to 60 % by weight of polyamide 6 or polyamide 6,6 (poly-hexamethylene adipamide) and only become cloudy with greater additions. The excellent flow properties of the blends is furthermore of great importance.

Even small additions of polyamide 6 or 6,6 permit complicated injection moulds with deep and narrow flows to be filled easily and completely.

In addition to the good properties named, such as stiffness, hardness, transparency and flow properties it has proved, surprisingly, that the toughness of the blends according to the invention is very good. It is generally known that it is difficult to obtain a satisfactory level of toughness with blends. In the case of the blends of the invention it has been found that the impact strength thereof is determined by the very tough polyamide 6 or 6,6-components. It is, therefore, possible to mix, very advantageously from the economic point of view, a low molecular weight polyamide which is easily prepared in the melt condensation process but relatively brittle, with for example, polyamide 6,6, and thereby to obtain an impact resistant blend of high hardness and stiffness.

As measurement for the mean degree of polymerization of the blends (compounds) the reduced specific viscosity (RSV) thereof in a solution of a gram of the polyamide or of the polyamide mixture in 100 ml of phenol/tetrachlorethane (in the weight ratio 60 : 40) at 24°C is used. The RSV may vary 1.0 to 2.5 dl/g, preferably from 1.2 to 2.0 dl/g.

The polyamides according to the invention can be used in all cases where good mechanical properties are necessary.

The polyamides can be especially advantageously injection moulded into technical parts as well as also processed into sheets, plates and tubes. The products may, optionally, also contain mixed in additives, such as, for example, antistatic agents, flame retarding agents, heat and light stabilizers, lubricants and plasticisers, pigments, dyestuffs, optical brighteners, mould release agents and fillers, such as asbestos fibres, glass fibres, carbon black, graphite, finely pulverized metals or metal oxides, ground glass and molybdenum sulfide.

The following examples illustrate the invention.

EXAMPLES

In the following examples the viscosity measurements were carried out at 25°C with solutions of 1 gram of polyamide or polyamide mixture in 100 ml of phenol-tetrachloroethane (3 + 2 parts by weight).

The ball indentation hardness was determined according to DIN 53 456 at a load of 50 kg, a ball diameter of 5 mm and a measuring time of 10 seconds.

The elasticity modulus was determined by the bending experiment according to DIN 53 452 with a standard test bar.

To ascertain the toughness properties a falling test was used, which allowed a good differentiation even with very tough products. Injection moulded plates measuring 6 × 6 × 0.2 cm were placed on a rigid support, having a circular bore (diameter: 2.6 cm), in such a way that the centre of the plate is above the bore. A falling body (weight: 940 g) carrying a steel ball (diameter: 0.9 cm) at its lower end was dropped from various heights vertically and concentric to the bore onto the plate. As a measure of the impact strength there was determined the "mean falling height in cm which denoted the height from which the falling body must fall onto the plates in order to cause 50 % of them to break. The tests were carried out after the injection moulded plates had been stored for 5 days in air at 20°C.

The abbreviation BAC means a diamine mixture of 70 % 1,3-bis-(amino-methyl)-cyclohexane and 30 % 1,4-bis-(amino-methyl)-cyclohexane, in which mainly the trans-isomers are present.

STARTING PRODUCTS

Polyamide $A_1$

Prepared according to the usual polycondensation process from 10 kg of terephthalic acid, 8.6 kg of BAC and 4.6 kg of $\epsilon$-caprolactam. RSV = 1.59 dl/g.

Polyamide $A_2$

The same components and proportions as for polyamide $A_1$, were used the polycondensation was only carried on until the polyamide had a viscosity of 0.95 dl/g.

Polyamide A₃

Prepared according to the usual polycondensation process from 60 mol of terephthalic acid, 25.7 mol of adipic acid, 71.3 mol of BAC and 26.1 mol of hexamethylene diamine. RSV = 1.65 dl/g.

Polyamide A₄

The same components and proportions as for the polyamide A₃ were used, with the exception however, that 8.7 kg of pure 1,3-bis-(amino-methyl)-cyclohexane were used.

Polyamide B₁

Poly-ε-capron amide (polyamide 6), RSV = 2.05 dl/g.

Polyamide C₁

Poly-hexamethylene adipamide (polyamide 6.6), RSV = 2.21 dl/g.

The dry polyamides in granular form were mixed in a mixer, in each case one polyamide of the series A with a polyamide of the series B, and then injection moulded in a screw injection extruder, with a cylinder temperature of from 270° to 280°C, into shaped articles and test articles. The mould temperature was 70°C in each case.

EXAMPLES 1 to 7

| Ex. | composition of the blend | | RSV (dl/g) | Properties of the injection moulded blend | | |
|---|---|---|---|---|---|---|
| | % by wt. $A_1$ | % by wt. $B_1$ | | optical appearance | hardness [kg/cm²] | E-modulus [kg/cm²] |
| 1 | 100 | 0 | 1.53 | yellowish, transparent | 1860 | 31700 |
| 2 | 80 | 20 | 1.59 | slightly yellowish transparent | 1895 | 32500 |
| 3 | 65 | 35 | 1.65 | transparent | 1820 | 31600 |
| 4 | 50 | 50 | 1.71 | transparent | 1740 | 28700 |
| 5 | 35 | 65 | 1.81 | slightly cloudy | 1560 | 24200 |
| 6 | 20 | 80 | 1.89 | opaque | 1280 | 17000 |
| 7 | 0 | 100 | 2.01 | Cloudy white | 1285 | 16900 |

EXAMPLES 8 to 12

| Ex. | composition of the blend | | Impact strength of the injection moulded blend mean falling ht. [cm] |
|---|---|---|---|
| | % by wt. $A_2$ | % by wt. $B_1$ | |
| 8 | 100 | 0 | 40 |
| 9 | 90 | 10 | 150 |
| 10 | 80 | 20 | 170 |
| 11 | 70 | 30 | 200 |
| 12 | 0 | 100 | 200 |

EXAMPLES 13 to 19

| Ex. | composition of the blend | | RSV (dl/g) | Properties of the injection moulded blend | | |
|---|---|---|---|---|---|---|
| | % by wt. $A_3$ | % by wt. $C_1$ | | optical appearance | hardness [kg/cm²] | E-modulus [kg/cm²] |
| 13 | 100 | 0 | 1.62 | slightly yellow transparent | 1890 | 31300 |
| 14 | 80 | 20 | 1.62 | transparent | 1885 | 31300 |
| 15 | 65 | 35 | 1.82 | transparent | 1850 | 28300 |
| 16 | 50 | 50 | 1.88 | transparent | 1740 | 28200 |
| 17 | 35 | 65 | 2.04 | rather weak clouding | 1500 | 26700 |
| 18 | 20 | 80 | 2.15 | opaque | 1595 | 25700 |
| 19 | 0 | 100 | 2.20 | white | 1530 | 25400 |

EXAMPLES 20 to 22

| Ex. | composition of the blend | | RSV (dl/g) | Properties of the injection moulded blend | | |
|---|---|---|---|---|---|---|
| | % by wt. $A_4$ | % by wt. $C_1$ | | optical appearance | hardness [kg/cm²] | E-modulus [kg/cm²] |
| 20 | 100 | 0 | 1.54 | transparent | 1870 | 32000 |
| 21 | 75 | 25 | 1.74 | transparent | 1860 | 31700 |
| 22 | 50 | 50 | 1.86 | transparent | 1750 | 29000 |

What is claimed is:

1. A mixture of thermoplastic polyamides consisting essentially of a. at least one polyamide composed of units of the general formula $$-(NH-R_1-NH-CO-R_2-CO)-$$  Ia in an amount of m mol %, and $$-(NH-R_3-CO)-$$  Ib in an amount of n mol %, and the end groups $R_4$ and $R_5$ wherein $R_1$ represents cyclohexane-1,3-bis-methylenyl units, from 0 to 50 mol %, based on the total mol percentage of cyclohexane-bis-methylenyl units, of cyclohexane-1,4-bis-methylenyl units and from 0 to 70 mol % of straight chain, bivalent aliphatic hydrocarbon radicals containing from 4 to 20 carbon atoms, the proportion of aliphatic hydrocarbon units being in the range 5 to 70 mol % when n = 0 mol %, and when n is greater than 0 mol %, the mol percentage of aliphatic hydrocarbon units being reduced by the proportion which corresponds to n, the mol percentage of aliphatic hydrocarbon units being based on the sum of the cyclohexane-bis-methylenyl units and the aliphatic hydrocarbon units, $R_2$ represents bivalent aromatic hydrocarbon units containing from 5 to 18 carbon atoms, and from 0 to 70 mol % of bivalent aliphatic saturated hydrocarbon units containing from 3 to 18 carbon atoms, the proportion of aliphatic units being within the range 5 to 70 mol % when n = 0 mol %, and when n is greater than 0 mol %, the mol percentage of aliphatic units being reduced by the proportion which corresponds to n, the mol percentage of aliphatic hydrocarbon units being based on the sum of the aromatic and aliphatic units, $R_3$ represents straight chain, bivalent aliphatic hydrocarbon units containing from 3 to 19 carbon atoms, $R_4$ represents H, or $OC-R_2-COOH$, or $OC-R_3-NH$, $R_5$ represents OH or $NH-R_1-NH_2$, or $NH-R_3-COOH$, and m and n are the mol percentages of the units Ia and Ib in the macromolecule and m + n = 100, n being 0 or a finite value such that the value of n alone or together with the mol percentages of straight chain, bivalent, aliphatic hydrocarbon units $R_1$ and $R_2$ is from 5 to 70 mol %, based on the total weight of polyamide, said polyamide (a) having a mean degree of polymerization corresponding to a reduced specific viscosity of from 0.8 to 2.0 dl/g, as determined in a solution of 1 gram of the polyamide in 100 ml of phenol/tetrachloroethane at a weight ratio of 60:40 at 25°C., and b. at least one polyamide of the general formula II $$H-NH-R_3-CO-OH$$

wherein $R_3$ has the meaning given above but may be different from the radical $R_3$ in formula Ib and y indicates the mean degree of polymerization corresponding to a reduced specific viscosity within the range 1.2 to 3.0 dl/g as determined at 25°C. in a solution of 1 graom of the polyamide in 100 ml of phenol/tetrachloroethane at a weight ratio of 60:40, and/or c. at least one polyamide of the general formula $$R_8-NH-R_6-NH-CO-R_7-CO-R_9$$
               z wherein $R_6$ represents straight chain, aliphatic hydrocarbon units containing from 4 to 20 carbon atoms, $R_7$ represents aliphatic saturated hydrocarbon units containing from 3 to 18 carbon atoms, $R_8$ represents H or $OC-R_7-COOH$, and $R_9$ represents OH or $NH-R_6-NH_2$, and z indicates the mean degree of polymerization corresponding to a reduced specific viscosity within the range 1.2 to 3.0 dl/g as determined at 25°C. in a solution of 1 gram of the polyamide in 100 ml of phenol/tetrachloroethane at a weight ratio of 60:40, the proportion of polyamide (b) and/or (c) in the mixture being from 1 to 70% by weight.

2. A mixture of polyamides according to claim 1, wherein the proportion of polyamide (b) and/or (c) is from 3 to 60 % by weight.

3. A mixture of polyamides according to claim 1, the mean degree of polymerization of the polyamide (a) of which corresponds to a reduced specific viscosity of from 1.0 to 1.7 dl/g.

4. A mixture of polyamides according to claim 1, the mean degree of polymerization y of the polyamide (b) of which corresponds to a reduced specific viscosity of from 1.8 to 2.5 dl/g.

5. A mixture of polyamides according to claim 1, the mean degree of polymerization z of the polyamide (c) of which corresponds to a reduced specific viscosity of from 1.8 to 2.5 dl/g.

6. A mixture of polyamides according to claim 1, wherein in the polyamide (a) the value of n alone or together with the proportions of the aliphatic hydrocarbon radicals $R_1$ and $R_2$ is from 10 to 40 mol %, calculated on the total weight of the polyamide.

7. A mixture of polyamides according to claim 1, wherein the $R_1$ units of the general formula Ia of the polyamide (a) comprise from 0 to 35 mol % of cyclohexane-1,4-bis-methylenyl units.

8. A mixture of polyamides according to claim 1 wherein n = 0 and the $R_1$ units comprise 10 to 40 mol % of aliphatic hydrocarbon units.

9. A mixture of polyamides according to claim 1 wherein n = 0 and the $R_2$ units comprise from 10 to 40 mol % of aliphatic hydrocarbon units.

10. A mixture of polyamides according to claim 1, wherein the straight chain, bivalent aliphatic hydrocarbon units represented by $R_1$ contain from 6 to 12 carbon atoms.

11. A mixture of polyamides according to claim 1, wherein the bivalent aromatic hydrocarbon units represented by $R_2$ contain from 6 to 12 carbon atoms.

12. A mixture of polyamides according to claim 1, wherein the bivalent aromatic hydrocarbon units represented by $R_2$ are mono-nuclear hydrocarbon radicals bound in meta or para position.

13. A mixture of polyamides according to claim 1, wherein the bivalent aliphatic saturated hydrocarbon units represented by $R_2$ contain 4 to 10 carbon atoms.

14. A mixture of polyamides according to claim 1, wherein the straight chain, bivalent aliphatic hydrocarbon units represented by $R_3$ contain 4 to 11 carbon atoms.

15. A mixture of polyamides according to claim 1, wherein in the polyamide b) of the general formula II the straight chain, bivalent aliphatic hydrocarbon units $R_3$ contain 4 to 11 carbon atoms.

16. A mixture of polyamides according to claim 1, wherein in the polyamide c) of the general formula III the straight chain aliphatic hydrocarbon units $R_6$ contain 6 to 12 carbon atoms.

17. A mixture of polyamides according to claim 1, wherein in the polyamide c) of the general formula III the aliphatic saturated hydrocarbon units $R_7$ contain 4 to 10 carbon atoms.

18. A mixture of thermoplastic polyamides consisting essentially of a. at least one polyamide composed of units of the general formula

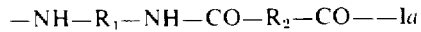

$$-NH-R_1-NH-CO-R_2-CO-- \quad Ia$$

and the end groups $R_4$ and $R_5$, wherein $R_1$ represents a cyclohexane-1,3-bis-methylenyl radical, from 0 to 50 mol %, based on the total mol percentage of cyclohexane bis-methylenyl units, of cyclohexane-1,4-bis-methylenyl units, and straight chain, aliphatic bivalent hydrocarbon units containing from 4 to 20 carbon atoms, the proportion of the aliphatic hydrocarbon units, based on the total mol percentage of cyclohexane-bis-methylenyl units and aliphatic hydrocarbon units, being from 5 to 50 mol %, $R_2$ represents para-phenylene units, meta-phenylene units or mixtures thereof, and aliphatic saturated bivalent hydrocarbon units containing from 3 to 18 carbon atoms, the proportion of the aliphatic hydrocarbon units, based on the sum of the para-phenylene and/or meta-phenylene units and aliphatic hydrocarbon units, being from 5 to 50 mol %, and the aliphatic hydrocarbon units $R_1$ and $R_2$ being present in equimolar quantities, $R_4$ represents H, or $-OC-R_2-COOH$, and
$R_5$ represents OH, or $-NH-R_1-NH_2$, said polyamide (a) having a mean degree of polymerization corresponding to a reduced specific viscosity of from 0.8 dl/g to 2.0 dl/g, and b. at least one polyamide of the general formula II

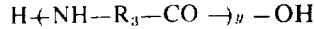

$$H + NH-R_3-CO +_y -OH \quad II$$

wherein $R_3$ represents straight-chain, bivalent aliphatic hydrocarbon units containing from 3 to 19 carbon atoms, and y indicates the mean degree of polymerization, which corresponds to a reduced specific viscosity of from 1.2 to 3.0 dl/g, and/or c. at least one polyamide of the general formula III

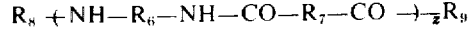

$$R_8 + NH-R_6-NH-CO-R_7-CO +_z R_9 \quad III$$

wherein $R_6$ represents straight chain aliphatic hydrocarbon units containing from 4 to 20 carbon atoms, $R_7$ represents aliphatic saturated hydrocarbon units containing 3 to 18 carbon atoms, $R_8$ represents H or $-OC-R_7-COOH$, $R_9$ represents OH or $NH-R_6-NH_2$, and z indicates the mean degree of polymerization which corresponds to a reduced specific viscosity of from 1.2 to 3.0 dl/g, the proportion of (b) and/or (c) in the mixture being from 1 to 70% by weight.

19. A mixture of thermoplastic polyamides consisting essentially of a. at least one polyamide composed of units of the general formula

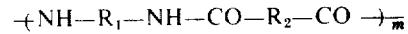

$$+NH-R_1-NH-CO-R_2-CO +_m \quad Ia$$

in an amount of m mol % and

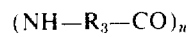

$$(NH-R_3-CO)_n \quad Ib$$

in an amount of n mol % and the end groups $R_4$ and $R_5$ wherein m is from 95 to 50 mol %, n is from 5 to 50 mol %, $R_1$ represents cyclohexane-1,3-bis-methylenyl units, based on the total mol percentage of cyclohexane-bis-methylenyl units, of from 0 to 50 mol %, cyclohexane-1,4-bis-methylenyl units, $R_2$ represents para-phenylene units, meta-phenylene units or mixtures thereof, $R_3$ represents $(CH_2)_5$, $R_4$ represents H or $OC-R_2-COOH$, or $OC-R_3-NH_2$, $R_5$ represents OH or $NH-R_1-NH_2$, or $NH-R_3-COOH$, said polyamide (a) having a mean degree of polymerization corresponding to a reduced specific viscosity of from 0.8 dl/g to 2.0 dl/g, and b. at least one polyamide of the general formula II

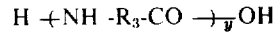

$$H + NH-R_3-CO +_y OH \quad II$$

wherein $R_3$ has the above meaning, and y indicates the mean degree of polymerization, which corresponds to a reduced specific viscosity of from 1.2 to 3.0 dl/g, and/or c. at least one polyamide of the general formula III

$$R_8 +_{NH-R_6}-NH-CO-R_7-CO +_z R_9 \quad III$$

wherein $R_6$ represents straight chain aliphatic hydrocarbon units containing from 4 to 20 carbon atoms, $R_7$ represents aliphatic saturated hydrocarbon units containing 3 to 18 carbon atoms, $R_8$ represents H or $OC-R_7-COOH$, $R_9$ represents OH or $NH-R_6-NH_2$, and z indicates the mean degree of polymerization which corresponds to a reduced specific viscosity of from 1.2 to 3.0 dl/g, the proportion of (b) and/or (c) in the mixture being from 1 to 70% by weight.

20. A mixture of polyamides according to claim 19, wherein in the polyamide a) of the proportion m of the units of the general formula I a is from 95 to 50 mol %, and the proportion n of the units of the general formula I b is from 5 to 50 mol %, and $R_1$ comprises cyclohexane-1,3-bis-methylenyl and from 0 to 50 mol % of cyclohexane-1,4-bis-methylenyl units, $R_2$ comprises para-phenylene units or meta-phenylene units or both, and $R_3$ represents a $-(CH_2)_5-$ radical.

21. A mixture of polyamides according to claim 19 wherein m is 90 to 70 mol % and n is 10 to 30 mol %.

* * * * *